Sept. 3, 1963   D. DOMINA   3,102,547
ADJUSTABLE SUPPORT FOR VEHICLE ROOFS AND FRICTION JOINT THEREFOR
Filed Aug. 20, 1959   3 Sheets-Sheet 1

United States Patent Office 3,102,547
Patented Sept. 3, 1963

3,102,547
ADJUSTABLE SUPPORT FOR VEHICLE ROOFS AND FRICTION JOINT THEREFOR
Delfried Domina, Grosshelfendorf, near Munich, Germany, assignor to Georg Fritzmeier, Munich, Germany
Filed Aug. 20, 1959, Ser. No. 835,105
Claims priority, application Germany Aug. 21, 1958
9 Claims. (Cl. 135—5)

The present invention relates to roof arrangements and in particular to adjustable roof arrangements of the type which are used, for example, on vehicles such as tractors.

With vehicles of the latter type it is customary to provide a relatively light roof member located over the operator of the vehicle and a means is provided for adjusting the position of this roof member. The adjustment conventionally requires loosening and tightening of one or more suitable nuts, for example, so that a certain inconvenience is involved in adjusting the roof member, particularly in the case of a tractor which is working a field and is changing its direction of movement quite frequently. Each change in the direction of movement the operator desires to position the roof so as to provide some protection against the sun or the rain, and where one or more nuts must be tightened and loosened at each adjustment, an extremely great inconvenience is created in the case of a vehicle of this type whose direction of movement changes quite frequently. Moreover, in a vehicle such as a tractor a considerable amount of dust arises due to the movement of the tractor and this dust also operation of the tractor extremely uncomfortable.

One of the objects of the present invention is to provide a roof arrangement of the type referred to above which can be very easily and quickly adjusted by the operator simply with one hand without in any way interrupting the operation of the tractor or the like, so that the inconvenience referred to above is completely eliminated.

It is also an object of the present invention to provide a roof arrangement which will guarantee that the operator does not ride in a cloud of dust.

It is also an object of the present invention to provide an extremely simple and at the same time highly efficient friction joint which will enable components of a linkage to be adjusted one with respect to the other simply by turning one with respect to the other in opposition to the force of friction while at the same time providing a force of friction sufficiently great to maintain the components in their adjusted position with respect to each other.

With the above objects in view, the present invention includes in an adjustable roof arrangement a support means and a roof member spaced from the support means over a position occupied by a person beneath the roof member. An adjustable link means is carried by the support means and carries the roof member, and this link means includes at least one friction joint which has sufficient friction to maintain the link means and therefore the roof member in their adjusted positions while at the same time permitting an adjustment to be carried out simply by manipulation of the link means by the operator. In order to prevent dust from having access to the operator, where the roof member is located over the operator of a vehicle such as a tractor, the roof member carries a fan means which directs a stream of air downwardly around the operator so as to prevent any dust from reaching the operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
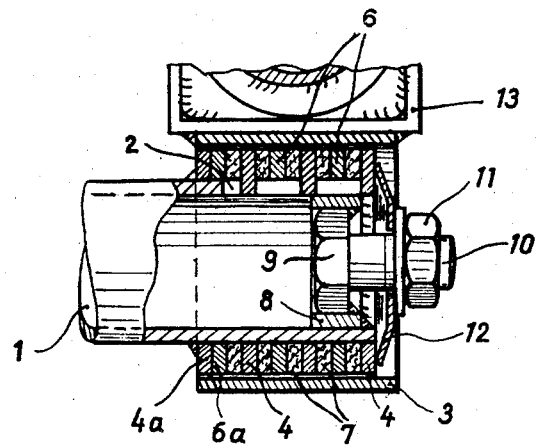
FIG. 1 is a fragmentary sectional view illustrating a friction joint according to the present invention.
Figure 3:
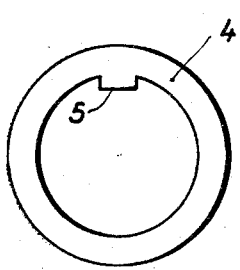
Figure 4:
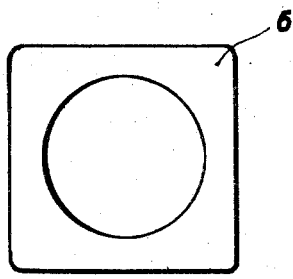
Figure 5:
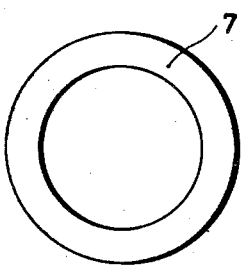
Figure 6:
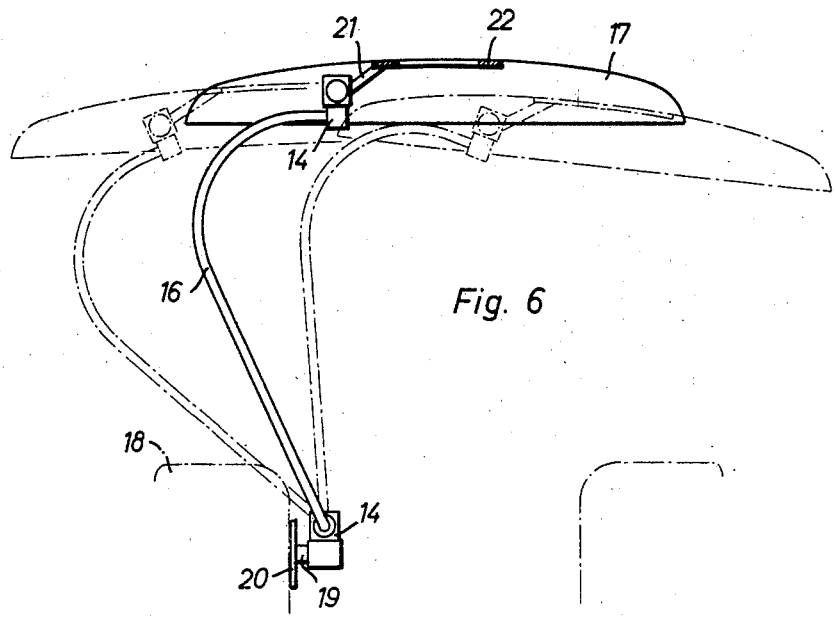
Figure 7:
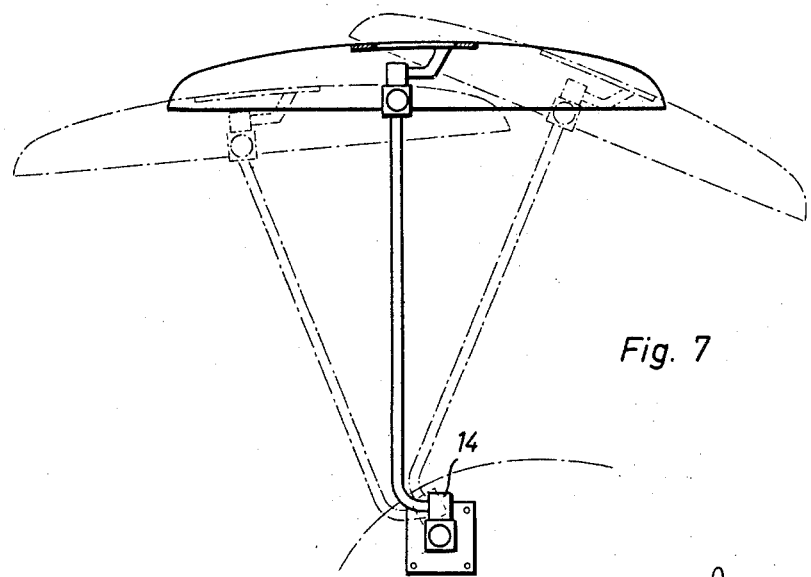

FIGS. 3–5 respectively illustrate three different types of friction members used in the friction joint of FIG. 1;

FIG. 6 illustrates the manner in which the joint of FIG. 1 forms part of an adjustable roof assembly;

FIG. 7 is a side view of the structure of FIG. 6; and

Figure 8:
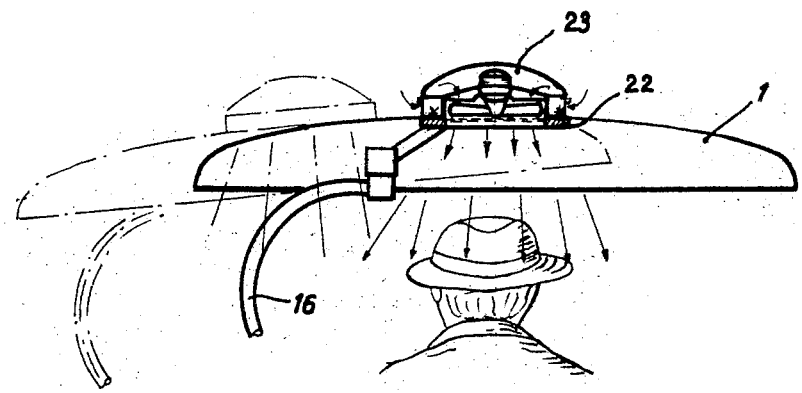

FIG. 8 illustrates the manner in which a roof member of the invention accommodates a fan to direct a stream of air downwardly onto and around the operator.

Referring now to FIGS. 1–5, it will be seen that the friction joint illustrated therein includes an elongated hollow tubular inner joint member 1 which is formed with an axially extending cutout in the form of the slot 2 shown in FIG. 1. This inner joint member 1 is of circular cross section and extends substantially co-axially into an elongated outer joint member 3 which is in the form of an elongated hollow tube which surrounds and is spaced from the inner joint member 1, this outer joint member 3 being of square cross section, for example. The inner joint member 1 is surrounded within the outer joint member 3 by a series of friction members described below.

Figure 2:
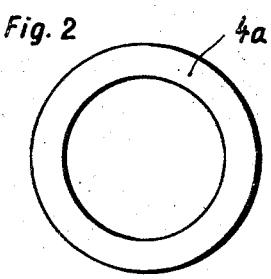
FIG. 2 illustrates an end friction member of the friction joint.

These friction members include the rings 4 illustrated in FIG. 3 and a single ring 4a which is shown in FIG. 2. These rings of FIGS. 2 and 3 are circular and the rings 4 which are shown in FIG. 3 are provided each with a projection 5. These rings have inner diameters corresponding to the outer diameter of the inner joint member 1, so that the rings can be slipped along the inner joint member 1 surrounding the latter to the positions illustrated in FIG. 1, and of course the rings 4 shown in FIG. 3 will have their projections 5 located in the elongated cutout 2 so that the rings 4 will not be turnable with respect to the inner joint member 1, while being axially movable therealong. The ring 4a is permanently fixed with the inner joint member 1 by being welded thereto, as illustrated in FIG. 1, and this ring 4a forms the first of the series of friction members.

The friction members within the outer joint member 3 include also a series of friction members 6 shown in FIG. 4, these friction members 6 being formed with circular openings through which the inner joint member 1 freely extends so that these members 6 and the inner joint member 1 are turnable one with respect to the other. However, it will be noted that the outer periphery of the members 6 has a configuration corresponding to the cross section of the outer joint member 3, and since this cross section of the outer joint member 3 and the outer periphery of each member 6 is non-circular-square, in the illustrated example—it is clear that there can be no relative rotation between the friction members 6 and the outer joint member 3.

As is apparent from FIG. 1, the series of friction members 6 alternate along the inner joint member 1 with the series of friction members 4, and the first of the series of friction members 6 is indicated at 6a directly next to the friction member 4a, this member 6a being fixed permanently to the outer joint member 3 as by being welded to the latter.

It will be noted that the friction members 6 while alternating respectively with the friction members 4 also are spaced from the latter. Within the spaces between the friction members 4 and 6 are located a third series of friction members 7. The friction members 4 and 6 are made of a metal such as sheet steel, while the friction members 7 are made of a material having a high coefficient of friction, such as, for example, asbestos having copper fibers embedded therein. The third series of friction members 7 are circular at both their inner and outer peripheries so that while they freely surround the inner joint member 1 they are turnable with respect to the latter as well as with respect to the outer joint member 3. As may be seen from FIG. 1, the arrangement is such that one of the first series of friction members 4 is followed by one of the third series of friction members 7 which is in turn followed by one of the second series of friction members 6, the latter being followed by a friction member 7 which is in turn followed by a friction member 4, and so on.

A means is provided for urging the series of friction members toward each other so that they are compressed against each other to provide the desired friction. This means includes an elongated screw member 10 whose head 9 is welded within a ring 8 which is fixed to the interior of the joint member 1 as being welded to the latter, so that the screw member 10 extends substantially coaxially with respect to the joint member 1, and this screw member 10 carries a nut 11 which presses against a spring means in the form of an annular dished spring 12, a suitable washer being interposed between the spring means 12 and the nut 11. The spring 12 bears against a friction member 4 which forms the last of the series of friction members, and it will be noted that the action of the spring is such that not only are the entire row of friction members compressed against each other and pressed against the friction member 6a which is fixed to the outer joint member 3, but in addition the spring 12 acts to press the friction member 4a to the right, as viewed in FIG. 1, against the friction member 6a so as to retain the joint member 1 in the position illustrated within the outer joint member 3. The nut 11 serves as a means for adjusting the friction of the joint of the invention, and as will be apparent from the description which follows, this friction is set so that an adjusted position will be maintained simply by friction without inhibiting a change in the adjustment by a simple movement by the operator of one joint member with respect to the other.

As may be seen from FIG. 1, a pair of friction joint means as described above are jointed together in mutually perpendicular relation so as to form a universal friction joint. Thus, it will be seen that the outer joint member 13 of the second friction joint means, this outer joint member 13 being identical with the member 3 and all of the other structure within the joint member 13 being identical wtih the structure shown in FIG. 1 within the member 3, is fixed as by welding to the outer joint member 3 in a position where the axes of the pair of friction joint means are mutually perpendicular so as to form a universal friction joint.

FIGS. 6 and 7 illustrate the manner in which the above-described friction joint structure of the invention is incorporated into an adjustable roof arrangement capable of being used, for example, with a vehicle such as a tractor. Referring to FIGS. 6 and 7 it will be seen that a roof member 17 is illustrated therein, this roof member being a simple plastic roof member well known in the art. The friction universal joints of the invention are shown in FIG. 6 at 14. The vehicle such as a tractor has a support means in the form of a fender 18, for example, to which a plate 20 which carries the entire structure is fixed. This plate 20 forms an outwardly directed flange which is integral, for example, with a tubular member 19 corresponding to the member 1 described above. The inner joint member of the upper part of the lower universal joint 14 shown in FIG. 6 has an extension which forms the link member 16, and the upper end of this link member 16, as viewed in FIG. 6, forms the inner joint member of the upper friction universal joint 14, at the lower portion of the latter. A second link 21 forms the inner joint member of the other part of the upper universal friction joint 14 of FIG. 6, and this link 21 is fixed to a ring 20 which is in turned fixed to the roof member 17. This roof member 17 may be made of a pressed plastic sheet which is reinforced with suitable fibers. The plate 20 may, for example, be connected to the inner side of the fender 18, or it may be fixed to any desired part of the vehicle.

With this arrangement the link 16 is turnable with respect to the support means 18, 20 in any desired direction simply by movement of this link 16 by the operator, and the friction produced by the friction joint of the invention is capable of holding the link 16 in whichever position it is placed in by the operator without inhibiting any change in the position of the link 16 simply by turning of the latter. In the same way, if desired, the link 21 can be moved with respect to the link 16. Thus, it is possible for the operator to quickly and easily place the roof member 17 in whatever attitude desired to provide the desired protection against rain or sunshine.

In the embodiment of FIGS. 6 and 7, the ring 22 is carried by the roof member 17 which closes the opening which is surrounded by the ring 22. In the embodiment of FIG. 8, the ring 22 has its opening uncovered by the roof member which is formed with a suitable opening aligned with the space surrounded by the ring 22, and in this embodiment a fan assembly 23 is mounted on the ring 22 by being screwed to the latter, this fan assembly 23 being connected to any suitable source of current such as the battery of the vehicle and the motor of the fan assembly drives the fan thereof in a direction which blows a stream of air downwardly toward and around the operator. This arrangement is illustrated in FIG. 8. As a result of the adjustability of the roof assembly of the invention, as described above, the operator can direct the stream of air provided by the fan 23 in any desired direction simply by changing the position of the roof. This arrangement of FIG. 8 is of particular significance with tractors where the stream of air provided by the fan 23 serves not only the function of cooling the operator but in addition serves the function of preventing any dust which is raised by the tractor from reaching the operator so that the operator's comfort is greatly enhanced with this construction. If desired, the surfaces of the metallic friction members 4 and 6 may be roughened so as to increase the friction.

It will be understood that each of the elements described above, or two or more together, may also find a useful application in other types of roof assemblies differing from the types described above.

While the invention has been illustrated and described as embodied in adjustable roof assemblies, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An adjustable roof arrangement comprising, in combination, support means; a roof member spaced from said support means over a position which is adapted to be occupied by a person beneath the roof member; and adjustable linkage means carried by said support means and carrying said roof member and being accessible to the person beneath the latter for universally adjusting the position of the roof member, said adjustable linkage means including a self-locking first universal friction joint operatively connected to said roof member, a self-locking second universal friction joint operatively connected to said support means, and a link member operatively connected at its ends to said first and second universal friction joint, respectively, for automatically maintaining said roof member in adjusted position relative to said link member and said support means and for automatically maintaining said link member in adjusted position relative to said roof member and said support means so that the operator need not loosen either of said joint means before adjustment or tighten it after adjustment.

2. An adjustable roof arrangement comprising, in combination, support means; a roof member spaced from said support means over a position which is adapted to be occupied by a person beneath the roof member; and adjustable linkage means carried by said support means and carrying said roof member and being accessible to the person beneath the latter for adjusting the position of the roof member, said adjustable linkage means including a link member and a pair of self-locking universal friction joints respectively located at the ends of said link member having a force of friction sufficient to maintain the linkage means and the roof member automatically in the adjusted position thereof while at the same time permitting free adjustment of the linkage means with respect to the roof member and the support means and of the roof member with respect to the linkage means and the support means simply by movement of said linkage means and roof member, respectively, each joint including an end portion of said elongated link member, a casing surrounding and spaced from said end portion of said link member, a plurality of friction elements arranged in succession on said portion of said link member in said casing and being alternately connected non-rotatably to said link member and casing, and means cooperating with said friction elements for axial compressing of the same against each other.

3. An adjustable roof arrangement comprising, in combination support means; a roof spaced from said support means over a position which is adapted to be occupied by a person beneath said roof; and linkage means carried by said support means and carrying said roof, said linkage means including a self-locking first universal friction joint operatively connected to said roof, a self-locking second universal friction joint operatively connected to said support means, and a link member operatively connected at its ends to said first and second universal friction joint, respectively, for automatically maintaining said roof in adjusted position relative to said link member and said support means and for automatically maintaining said link member in adjusted position relative to said roof and said support means so that the operator need not loosen either of said joint means before adjustment or tighten it after adjustment, said joints including an inner joint member of circular cross section constituting an end portion of said link member and formed with a cutout extending axially along said inner joint member, an outer joint member of non-circular cross section surrounding and spaced from said inner joint member, a first series of circular friction members located within said outer joint member and surrounding said inner joint member, said first series of circular friction members respectively having projections extending into said cutout of said inner joint member so that said first series of friction members are connected to said inner joint member for turning movement with the latter, a second series of friction members surrounding said inner joint member located within said outer joint member, alternating with said first series of friction members, being freely turnable with respect to said inner joint member, and having a cross sectional outer configuration conforming to that of said outer joint member so that said second series of friction members have also a non-circular configuration at their outer peripheries and are not turnable with respect to said outer joint member, and means axially urging said first and second friction members toward each other.

4. In an adjustable roof arrangement, in combination, support means; a roof spaced from said support means over a position which is adapted to be occupied by a person beneath said roof; and linkage means carried by said support means and carrying said roof, said linkage means including a self-locking first universal friction joint operatively connected to said roof, a self-locking second universal friction joint operatively connected to said support means, and a link member operatively connected at its ends to said first and second universal friction joint, respectively, for automatically maintaining said roof in adjusted position relative to said link member and said support means and for automatically maintaining said link member in adjusted position relative to said roof and said support means so that the operator need not loosen either of said joint means before adjustment or tighten it after adjustment, said joints including an outer elongated hollow joint member of non-circular cross section, an inner joint member arranged substantially co-axially within and surrounded by said outer joint member and constituting an end portion of said link member, said inner joint member being formed in said outer joint member with an elongated cutout, a first series of circular friction members surrounding said inner joint member, located within said outer joint member, and respectively having projections extending into paid cutout so that said first series of friction members are connected to said inner joint member for turning movement with the latter, a second series of friction members alternating with said first series of friction members also surrounding said inner joint member and located within said outer joint member, said second series of friction members respectively having outer peripheral configurations corresponding to the cross sectional configuration of said outer joint member so that said second series of friction members are non-turnable with respect to said outer joint member, a screw member fixed co-axially to said inner joint member and extending freely beyond an end of said inner joint member, a nut carried by said screw member, spring means surrounding said screw member, engaging said nut, and compressed by the latter against that one of said friction members which is nearest to said nut for urging the friction members away from said nut, the friction member which is most distant from said nut being fixed to one of said joint members so that said spring means urges the series of friction members toward each other.

5. In an adjustable roof arrangement, in combination, support means; a roof spaced from said support means over a position which is adapted to be occupied by a person beneath said roof; and linkage means carried by said support means and carrying said roof, said linkage means including a self-locking first universal friction joint operatively connected to said roof, a self-locking second universal friction joint operatively connected to said support means, and a link member operatively connected at its ends to said first and second universal friction joint, respectively, for automatically maintaining said roof in adjusted position relative to said link member and said support means and for automatically maintaining said link member in adjusted position relative to said roof and said support means so that the operator need not loosen either of said joint means before adjustment or tighten it after adjustment, said joints including an outer elongated hollow joint member of non-circular cross section, an inner joint member arranged substantially co-axially within and surrounded by said outer joint member and constituting an end portion of said link member, said inner joint member being formed in said outer joint member with an elongated cutout, a first series of circular friction members surrounding said inner joint member, located within said outer joint member, and respectively having projections extending into said cutout so that said first series of friction members are connected to said inner joint member for turning movement with the latter, a second series of friction members alternating with said first series of friction members also surrounding said inner joint member and located within said outer joint member, said second series of friction members respectively having outer peripheral configurations corresponding to the cross sectional configuration of said outer joint member so that said second series of friction members are non-turnable with respect to said outer joint member, a screw member fixed co-axially to said inner joint member and extending freely beyond an end of said inner joint member, a nut carried by said screw member, spring means surrounding said screw member, engaging said nut, and compressed by the latter against that one of said friction members which is nearest to said nut for urging the friction members away from said nut, the friction member of said first series which is most distance from said nut being fixed to said inner joint member and the friction member of said second series which is most distant from said nut being fixed to said outer joint member.

6. An adjustable roof arrangement comprising, in combination, support means; a roof spaced from said support means over a position which is adapted to be occupied by a person beneath said roof; and linkage means carried by said support means and carrying said roof, said linkage means including a self-locking first universal friction joint operatively connected to said roof, a self-locking second universal friction joint operatively connected to said support means, and a link member operatively connected at its ends to said first and second universal friction joint, respectively, for automatically maintaining said roof in adjusted position relative to said link member and said support means and for automatically maintaining said link member in adjusted position relative to said roof and said support means so that the operator need not loosen either of said joint means before adjustment or tighten it after adjustment, said joints including an outer elongated hollow joint member of non-circular cross-section, an inner joint member of circular cross section and constituting an end portion of said link member and located substantially co-axially with said outer joint member and surrounded by and spaced from the latter, said inner joint member being formed within said outer joint member with an elongated cutout, a series of first friction members of circular configuration spaced from each other along said inner joint member within said outer joint member and respectively having projections extending into said cutout so that said series of first friction members cannot turn with respect to said inner joint member, a series of second friction members alternating with and spaced from said series of first friction members and also surrounding said inner joint member within said outer joint member, said second friction members respectively having outer peripheral configurations corresponding to the non-circular cross sectional configuration of said outer joint member so that said series of second friction members are not turnable with respect to said outer joint member but are turnable with respect to said inner joint member, a third series of friction members surrounding said inner joint member and located within said outer joint member and being free to turn with respect to both of said joint members, said series of third friction members being located in the spaces between the series of first and series of second friction members so that a first friction member is followed by a third friction member which is followed by a second friction member which is in turn followed by a third friction member etc., and means cooperating with all of said friction members for urging the same toward each other.

7. An adjustable roof arrangement comprising, in combination, support means; a roof spaced from said support means over a position which is adapted to be occupied by a person beneath said roof; and linkage means carried by said support means and carrying said roof, said linkage means including a self-locking first universal friction joint operatively connected to said roof, a self-locking second universal friction joint operatively connected to said support means, and a link member operatively connected at its ends to said first and second universal friction joint, respectively, for automatically maintaining said roof in adjusted position relative to said link member and said support means and for automatically maintaining said link member in adjusted position relative to said roof and said support means so that the operator need not loosen either of said joint means before adjustment or tighten it after adjustment, said joints including an outer elongated hollow joint member of non-circular cross-section, an inner joint member of circular cross section and constituting an end portion of said link member and located substantially co-axially with said outer joint member and surrounded by and spaced from the latter, said inner joint member being formed within said outer joint member with an elongated cutout, a series of first friction members of circular configuration spaced from each other along said inner joint member within said outer joint member and respectively having projections extending into said cutout so that said series of first friction members cannot turn with respect to said inner joint member, a series of second friction members alternating with and spaced from said series of first friction members and also surrounding said inner joint member within said outer joint member, said second friction members respectively having outer peripheral configurations corresponding to the non-circular cross sectional configuration of said outer joint member so that said series of second friction members are not turnable with respect to said outer joint member but are turnable with respect to said inner joint member, a third series of friction members surrounding said inner joint member and located within said outer joint member and being free to turn with respect to both of said joint members, said series of third friction members being located in the spaces between the series of first and series of second friction members so that a first friction member is followed by a third friction member which is followed by a second friction member which is in turn followed by a third friction member etc., and means cooperating with all of said friction members for urging the same toward each other, said first and second friction members being made of metal and said third friction members being made of a material which has a high coeffiicent of friction.

8. An adjustable roof arrangement, comprising, in combination, support means; a roof spaced from said support means over a position which is adapted to be occupied by a person beneath said roof; and linkage means carried by said support means and carrying said roof, said linkage means including a self-locking first universal friction joint operatively connected to said roof, a self-locking second universal friction joint operatively connected to said support means, and a plurality of link members including a first link member fixed to said roof and linking said roof to said first universal friction joint, a second link member fixed to said support means and linking said support means to said second universal friction joint and a third link member operatively connected at its ends to said first and second universal friction joints, respectively, each of said first and second universal friction joints comprising a pair of friction joint units each including an outer elongated hollow joint member of non-circular cross section and an inner joint member of circular cross section constituting an end portion of said first, second and third link members, respectively, and extending substantially co-axially with said outer joint member and a plurality of friction elements surrounding said inner joint member, located within said outer joint member, alternately connected with said inner and outer joint members and means urging said friction members toward each other, and said outer joint members of the two friction joints being fixed to each other and having, respectively, axes which extend perpendicularly with respect to each other, for automatically maintaining said roof in adjusted position relative to said third link member and said support means and for automatically maintaining said third link member in adjusted position relative to said roof and said support means so that the operator need not loosen either of said universal friction joint means before adjustment or tighten it after adjustment.

9. An adjustable roof arrangement, comprising, in combination, support means; a roof member spaced from said support means and located over a position which is to be occupied by a person beneath the roof member; a first link member fixed to and extending from said support means; a second link member; means fixing said second link member to said roof member, said first and second link members respectively having ends located adjacent each other; and a pair of self-locking friction joint means respectively fixed to said adjacent ends of said first and second link members, said pair of friction joint means being fixed to each other and extending perpendicular with respect to each other so as to form a self-locking universal friction joint, and said friction joint means automatically holding the link members and therefore the roof member in an adjusted position solely by their friction while at the same time providing adjustment of the position of the roof simply by manual turning of one of said link members so that the operator need not loosen said joint means before adjustment or tighten it after adjustment.

References Cited in the file of this patent

UNITED STATES PATENTS

| | | |
|---|---|---|
| 176,145 | McRedmond et al. | Apr. 18, 1876 |
| 315,224 | Belknap | Apr. 7, 1885 |
| 2,442,697 | Krohm | June 1, 1948 |
| 2,493,121 | Ellis | Jan. 3, 1950 |
| 2,584,432 | De Marco | Feb. 5, 1952 |
| 2,627,217 | Hainke et al. | Feb. 3, 1953 |
| 2,859,058 | Traugott | Nov. 4, 1958 |
| 2,871,868 | Faasse et al. | Feb. 3, 1959 |
| 2,905,187 | Croce | Sept. 22, 1959 |

FOREIGN PATENTS

| | | |
|---|---|---|
| 784,815 | France | May 6, 1935 |